(12) United States Patent
Tian

(10) Patent No.: US 10,452,609 B2
(45) Date of Patent: Oct. 22, 2019

(54) METHOD AND SYSTEM FOR SCANNING LOCAL MEDIA FILE

(71) Applicants: SHENZHEN SKYWORTH DIGITAL TECHNOLOGY CO., LTD, Shenzhen (CN); SHENZHEN SKYWORTH SOFTWARE CO., LTD, Shenzhen (CN)

(72) Inventor: Chao Tian, Shenzhen (CN)

(73) Assignees: SHENZHEN SKYWORTH DIGITAL TECHNOLOGY CO., LTD, Shenzhen (CN); SHENZHEN SKYWORTH SOFTWARE CO., LTD, Shenzhen (CN)

( * ) Notice: Subject to any disclaimer, the term of this patent is extended or adjusted under 35 U.S.C. 154(b) by 235 days.

(21) Appl. No.: 15/490,400

(22) Filed: Apr. 18, 2017

(65) Prior Publication Data
US 2017/0220588 A1 Aug. 3, 2017

Related U.S. Application Data

(63) Continuation-in-part of application No. PCT/CN2015/073851, filed on Mar. 9, 2015.

(30) Foreign Application Priority Data

Nov. 4, 2014 (CN) .......................... 2014 1 0614511

(51) Int. Cl.
*G06F 16/00* (2019.01)
*G06F 16/13* (2019.01)
(Continued)

(52) U.S. Cl.
CPC ............ *G06F 16/13* (2019.01); *G06F 9/4881* (2013.01); *G06F 16/14* (2019.01); *G06F 16/148* (2019.01); *G06F 16/172* (2019.01); *G06F 16/48* (2019.01)

(58) Field of Classification Search
CPC ........ G06F 16/13; G06F 16/14; G06F 16/148; G06F 16/172; G06F 16/48; G06F 9/4881;
(Continued)

(56) References Cited

U.S. PATENT DOCUMENTS

| 6,741,996 B1* | 5/2004 | Brechner ................. G06F 16/40 |
| 7,181,438 B1* | 2/2007 | Szabo ................. G06F 21/6245 |

(Continued)

FOREIGN PATENT DOCUMENTS

| CN | 101609448 A | 12/2009 |
| CN | 102480494 A | 5/2012 |
| CN | 103856800 A | 6/2014 |

OTHER PUBLICATIONS

Anonymous: "1080P Full HD Media Center User Guide v1.1-S-3-6", May 13, 2014, pp. 1-48, XP055456029.
(Continued)

*Primary Examiner* — Noosha Arjomandi
(74) *Attorney, Agent, or Firm* — Fish IP Law, LLP

(57) ABSTRACT

A method for scanning a local media file is provided. The method includes: receiving a scanning instruction, acquiring an identifier of a storage device, and creating a view table mapped to by a data table; scanning the storage device, so as to acquire path information about a media file in the storage device; comparing the path information about the media file with path information about a media file in the data table, so as to acquire path information about a media file that does not exist in the data table, and storing the same in the data table; and scanning a newly added media file according to path information about the newly added media file in the data table, so as to acquire file information about the media file, and updating a database by adding the acquired file information about the media file.

16 Claims, 4 Drawing Sheets

(51) Int. Cl.
*G06F 16/48* (2019.01)
*G06F 16/14* (2019.01)
*G06F 16/172* (2019.01)
*G06F 9/48* (2006.01)

(58) Field of Classification Search
CPC ........ G06F 16/134; G06F 16/22; G06F 16/41; G06F 16/61; G06F 16/71; G06F 16/81; G06F 16/901
See application file for complete search history.

(56) References Cited

U.S. PATENT DOCUMENTS

| | | | | |
|---|---|---|---|---|
| 7,562,099 | B1* | 7/2009 | Walsh | G06F 16/447 |
| 9,100,245 | B1* | 8/2015 | Andrews | G06F 16/60 |
| 9,680,897 | B2* | 6/2017 | Tully | G06F 16/957 |
| 2004/0186854 | A1* | 9/2004 | Choi | G06F 16/40 |
| 2007/0038687 | A1* | 2/2007 | Carroll | G06F 16/41 |
| 2007/0043747 | A1* | 2/2007 | Benton | G06F 16/10 |
| 2007/0156778 | A1* | 7/2007 | Archer | G06F 16/1787 |
| 2007/0203927 | A1* | 8/2007 | Cave | G06F 16/14 |
| 2008/0010682 | A1* | 1/2008 | Hamid | G06F 21/564 |
| | | | | 726/24 |
| 2008/0250431 | A1 | 10/2008 | Lee et al. | |
| 2010/0036872 | A1 | 2/2010 | Hiraiwa et al. | |
| 2012/0063688 | A1* | 3/2012 | Honma | G06K 9/3233 |
| | | | | 382/218 |
| 2013/0166543 | A1* | 6/2013 | MacDonald | G06F 16/9535 |
| | | | | 707/723 |
| 2014/0304313 | A1* | 10/2014 | Choi | G06F 16/182 |
| | | | | 707/827 |
| 2015/0169566 | A1* | 6/2015 | Yang | H04L 67/1097 |
| | | | | 707/722 |
| 2015/0355856 | A1* | 12/2015 | Gilberton | G11B 27/034 |
| | | | | 711/162 |
| 2016/0092441 | A1* | 3/2016 | Zhang | G06F 16/14 |
| | | | | 707/758 |
| 2016/0291111 | A1* | 10/2016 | Pfeuffer | G01R 33/5607 |
| 2016/0328032 | A1* | 11/2016 | Chen | G06F 3/03543 |
| 2016/0370565 | A1* | 12/2016 | Bredno | G02B 21/244 |
| 2017/0034329 | A1* | 2/2017 | Sakai | H04W 76/18 |
| 2017/0169050 | A1* | 6/2017 | Tian | G06F 16/178 |
| 2017/0289617 | A1* | 10/2017 | Song | H04N 21/44008 |

OTHER PUBLICATIONS

Extended European search report issued in corresponding European application No. 15856523.4 dated Mar. 8, 2018.

* cited by examiner

METHOD AND SYSTEM FOR SCANNING LOCAL MEDIA FILE

CROSS REFERENCE TO RELATED APPLICATIONS

The present application is a continuation in part of International Patent Application No. PCT/CN2015/073851, filed on Mar. 9, 2015, which claims priority to Chinese Patent Application No. 201410614511.2, filed on Nov. 4, 2014, contents of both of which are hereby incorporated by reference in their entireties.

TECHNICAL FIELD

The present disclosure relates to a technical field of electronics, and in particular, to a method and a system for scanning a local media file.

BACKGROUND

With development of storage technology, a storage device has a storage capacity which has been greatly improved, and the user can make use of the storage device to store aperiodically collected media files, so as to build a home media center.

In prior art, technical solutions commonly used for playing the media files stored in the storage device are: (1) a first solution of browsing and playing the media files by browsing directories and files level by level; (2) a second solution of searching the media files in a local hard disk according to a simple strategy, and storing a search result for a user.

Upon the analysis of actual application condition of the prior art, there may be several disadvantages. With regard to the first solution, when the directories in the storage device have complicated levels and the files therein have a large number and various formats, the operation process may be time-consuming, complicated, and inconvenient for the user to search for a media file or media files by browsing the directories level by level. With regard to the second solution, since the storage device is not resident in a STB (Set Top Box) terminal device, the user may have to frequently plug or unplug the storage device. As the second solution scans the files according to such a simple strategy, the files in storage device should be fully scanned again when the user plug the storage device, such that the user may not browse all the media files soon during scanning. In addition, when the directories in the storage device have complicated levels and the files therein have a large number, it takes a long time to scan all the files according to such a simple scanning strategy, thereby reducing efficiency of scanning local media files.

BRIEF DESCRIPTION OF DRAWINGS

In order to more clearly describe technical solutions according to implementations of the present disclosure or prior art, accompanying drawings used for describing the implementations or prior art will be briefly introduced hereinafter. Apparently, the accompanying drawings described hereinafter merely show some implementations of the present disclosure, and persons skilled in the art may also derive other drawings from these accompanying drawings without creative efforts.

DETAILED DESCRIPTION

In conjunction with the drawings in the implementations of the present disclosure, a clear, complete description for the technical solutions in the implementations of the present disclosure is provided below. Apparently, the described implementations are a part rather than all of the implementations of the present disclosure. All other implementations acquired by persons skilled in the art according to the implementations of the present disclosure without creative efforts should fall within the protection scope of the present disclosure.

A terminal mentioned in the implementations of the present disclosure can be a smart TV, a STB, or a video or audio playing device which has a USB interface. A storage device mentioned in the implementations of the present disclosure can be a USB disk, a mobile hard disk, a TF card, or a SD Card.

Figure 1:
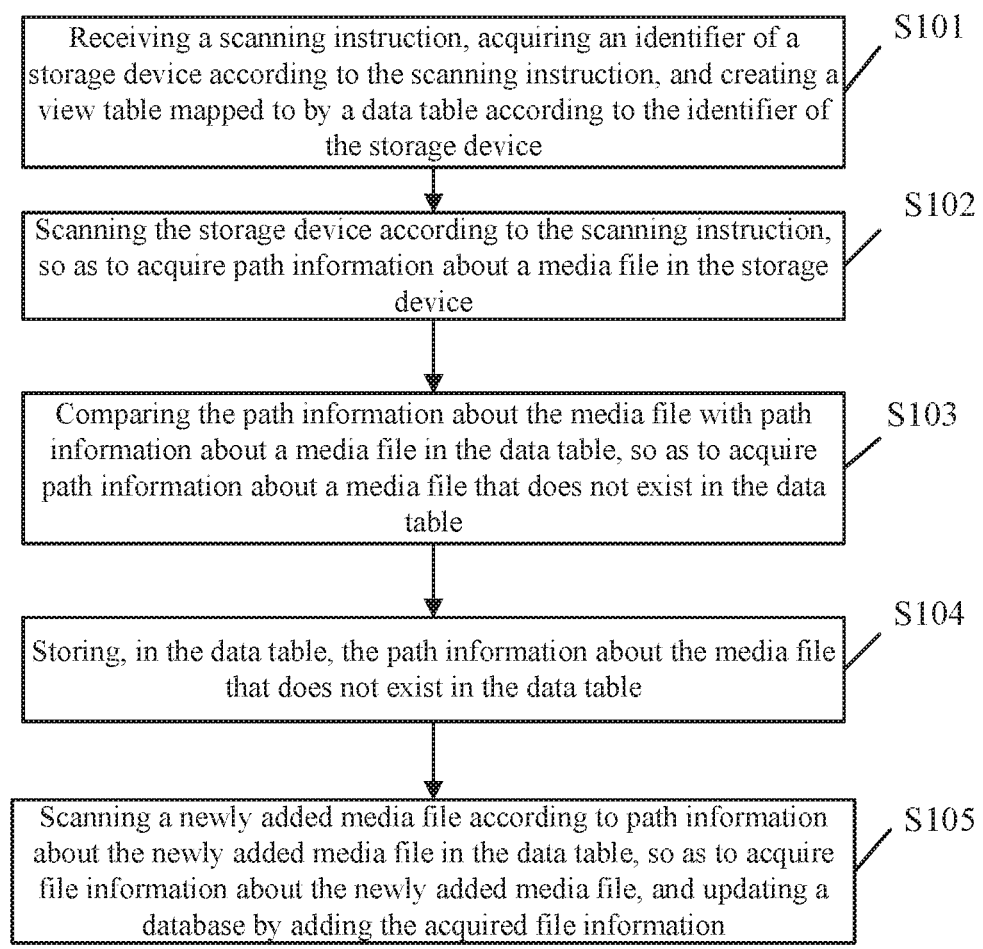
FIG. 1 is a flowchart of a method for scanning a local media file according to a first implementation of the present disclosure.

Referring to FIG. 1 which is a flowchart of a method for scanning a local media file according to a first implementation of the present disclosure, the method can include following steps.

Step S101: a scanning instruction is received, an identifier of a storage device is acquired according to the scanning instruction, and a view table mapped to by a data table is created according to the identifier of the storage device.

In some feasible implementations, the scanning instruction may be triggered by a user operation, an external storage device mounting operation, or a device starting operation. When receiving the scanning instruction, a system acquires and stores an UUID (Universally Unique Identifier) of the currently plugged storage device, and according to the identifier of the storage device, creates the view table to which the data table maps. The view table includes three views, i.e., a video view, an audio view, and an image view. The three views show information about media files which is quickly filtered from the data table and was already recorded in a media database during scanning when the current storage device was plugged into the STB terminal last time, and the three views change in real-time along with the change of the data in the data table. When the user wants to browse or play a video, music, an image, the user can quickly acquire information about all the media files in the storage device as long as he/she accesses the video view, the audio view, and the image view, respectively. The data table is a file table in the database. The file table is configured for storing information about various media files. In the file table, a _id field is configured for storing serial numbers of media file records which are arranged in ascending order. A _data field is configured for storing absolute path information about the media file in the storage device. A media_type field is configured for storing types of various media files, such as MP3, RMVB, JPEG and so forth. A date_added field is configured for storing time of adding each record. A date_modified field is configured for storing modification data of the media files. A width and height field is configured for storing resolution of image files. A device_id is configured for storing the UUID of the storage device, and a hard disk to which each record stored in the database belongs can be distinguished. When the storage device is detected being plugged, a device table is created, and the UUID of the storage device, the mounting path and the plugged/unplugged state of the storage disk are recorded in the device table in which the plugged state of the storage device is indicated by a numeral "1" and the unplugged state thereof is indicated by a numeral "0". When the storage device is detected being unplugged, the device table is searched for a record corresponding to the unplugged storage device and the state thereof is modified from "1" to "0". The file table is filtered, and the video view, the audio view, and the image view are created respectively, on condition that the plugged/unplugged state of the current storage device is "1" and the UUID recorded in the device_id field in the file table is consistent with the UUID corresponding to the storage device having a state of "1" recorded in the device table. These three views show the information about the media files which is quickly filtered from the file table and was already recorded in the media database during scanning when the current storage device was plugged into the terminal last time, and the three views change in real-time along with the change of the data in the file table. When an application need to browse or play a video, music, an image, the information about all the media files in the storage device can be quickly acquired as long as the video view, the audio view, the image view are accessed, respectively.

Step S102: the storage device is scanned according to the scanning instruction, so as to acquire path information about a media file in the storage device.

In some feasible implementations, when receiving the scanning instruction, the system performs a scan of a first stage on the storage device according to the scanning instruction. The scan of the first stage is configured for acquiring the path information about the media file in the storage device.

Step S103: the path information about the media file is compared with path information about a media file in the data table, so as to acquire path information about a media file that does not exist in the data table.

In some feasible implementations, in order to avoid adding again a media file already existing into the database in the database when the storage device is plugged into the terminal, the system firstly compares the path information about the media file acquired by scanning with the path information about the media file in the data table in the database corresponding to the storage device, and acquires the path information about the media file not existing in the data table, before detailed information about the media file is acquired by scanning the storage device.

Step S104: the path information about the media file that does not exist in the data table is stored in the data table.

In some feasible implementations, the system compares the path information about the media file acquired by scanning with the path information about the media file in the view table. If the path information about the media file does not exist in the view table, the media file that does not exist in the view table is accumulatively stored in a cache configured for temporarily storing the acquired path information about the media file that does not exist in the data table.

Further, the system determines whether the number of pieces of the path information about media files stored in the cache exceeds a preset threshold, for example, 500. If the system determines that the number of pieces of the path information about the media files stored in the cache exceeds 500, or the system determines that the number of pieces of the path information about the media files stored in the cache does not exceed 500 while the system finishes scanning the storage device, all the path information about the media files stored in the cache is stored in the data table.

Step S105: a newly added media file is scanned according to path information about the newly added media file in the data table, so as to acquire file information about the newly added media file, and a database is updated by adding the acquired file information.

In some feasible implementations, the system, according to the path information about the newly added media files in the data table, scans the newly added media files in the data table so as to acquire the specific information about the newly added media file, and updates the database by adding the acquired specific information about the media files. The scan is a scan of a second stage, and the specific information about the media file includes a thumbnail, a size, playing duration, modification time of a video file, a thumbnail, a size, a genre, playing duration of a music file, a size, a resolution, a shooting time, a rotation angle of an image file, and so on.

In the implementation of the present disclosure, by means of receiving a scanning instruction, acquiring an identifier of a storage device according to the scanning instruction, and creating a view table mapped to by a data table according to the identifier of the storage device, scanning the storage device according to the scanning instruction so as to acquire path information about a media file in the storage device, comparing the path information about the media file with path information about a media file in the data table so as to acquire path information about a media file that does not exist in the data table, storing, in the data table, the path information about the media file that does not exist in the data table, scanning a newly added media file according to the path information about the newly added media file in the data table, so as to acquire file information about the newly added media file, and updating a database by adding the acquired file information, media files in a plurality of mass data storage devices can be quickly aggregated when the storage devices are plugged alternately, thereby improving the efficiency of scanning a local media file.

Figure 2:
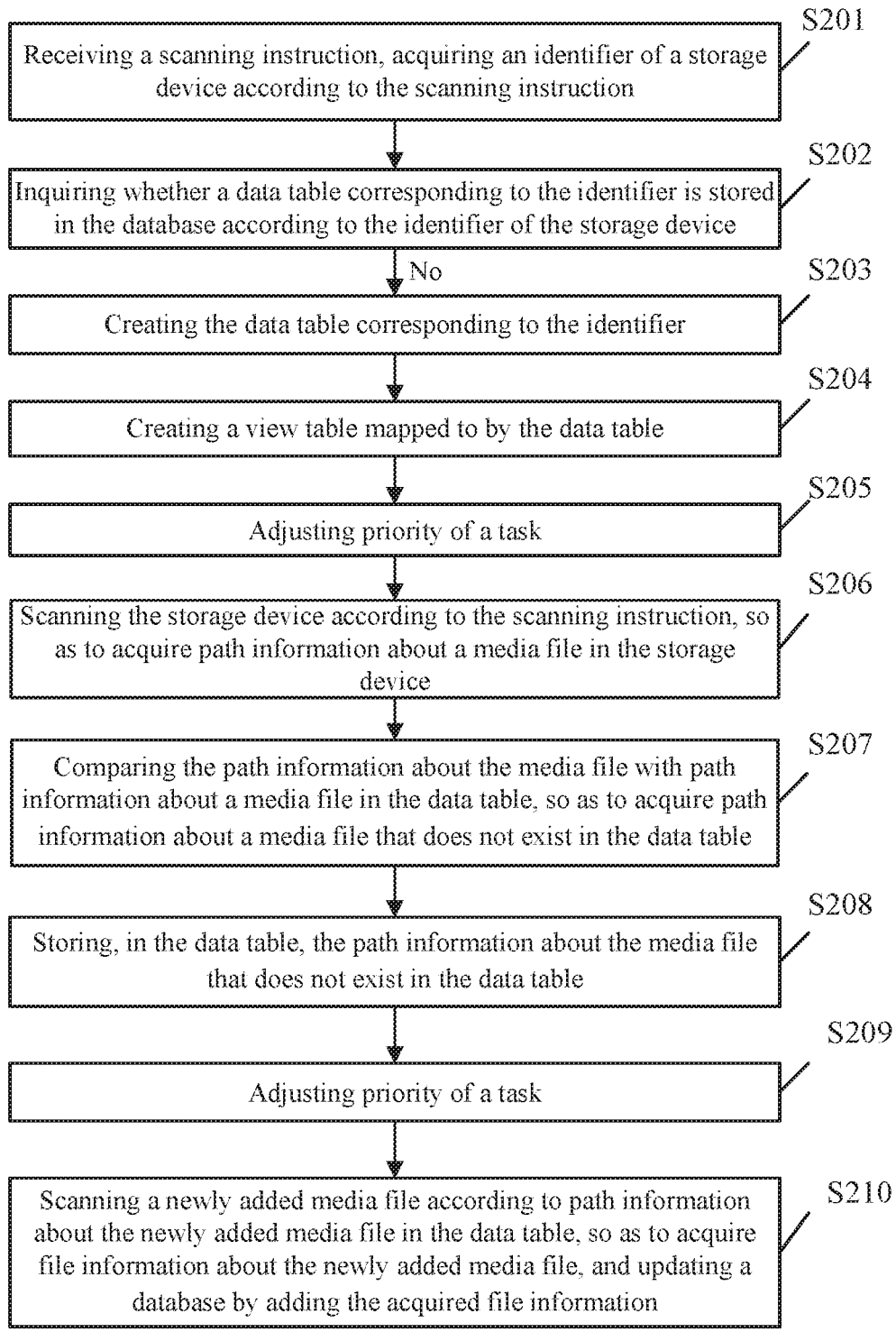
FIG. 2 is a flowchart of another method for scanning a local media file according to a second implementation of the present disclosure.

Referring FIG. 2 which is a flowchart of another method for scanning a local media file according to a second implementation of the present disclosure, the method can include following steps.

Step S201: a scanning instruction is received, and an identifier of a storage device is acquired according to the scanning instruction.

In some feasible implementations, the scanning instruction may be triggered by a user operation, an external storage device mounting operation, or a device starting operation. When receiving the scanning instruction, a system acquires and stores an UUID (Universally Unique Identifier) of the currently plugged storage device.

Step S202: whether a data table corresponding to the identifier is stored in a database is inquired according to the identifier of the storage device.

In some feasible implementations, whether the data table corresponding to the storage device is stored in the database is inquired according to the UUID of the storage device. The file table is configured for storing information about various media files. In the file table, a _id field is configured for storing serial numbers of media file records which are arranged in ascending order. A _data field is configured for storing absolute path information about the media file in the storage device. A media_type field is configured for storing types of various media files, such as MP3, RMVB, JPEG and so forth. A date_added field is configured for storing time of adding each record. A date_modified field is configured for storing modification data of the media files. A width and height field is configured for storing resolution of image files. A device_id is configured for storing the UUID of the storage device, and a hard disk to which each record stored in the database belongs can be distinguished. When the storage device is detected being plugged, a device table is created, and the UUID of the storage device, the mounting path and the plugged/unplugged state of the storage disk are recorded in the device table in which the plugged state of the storage device is indicated by a numeral "1" and the unplugged state thereof is indicated by a numeral "0". When the storage device is detected being unplugged, the device table is searched for a record corresponding to the unplugged storage device and the state thereof is modified from "1" to "0". The file table is filtered, and a video view, an audio view, and an image view are created respectively, on condition that the plugged/unplugged state of the current storage device is "1" and the UUID recorded in the device_id field in the file table is consistent with the UUID corresponding to the storage device having a state of "1" recorded in the device table. These three views show information about media files which is quickly filtered from the file table and was already recorded in the media database during scanning when the current storage device was plugged into the terminal last time, and the three views change in real-time along with the change of the data in the file table. When an application need to browse or play a video, music, an image, the information about all the media files in the storage device can be quickly acquired as long as the video view, the audio view, the image view are accessed, respectively.

Step S203: the data table corresponding to the identifier is created.

In some feasible implementations, when the system inquires that the data table corresponding to the identifier is stored in the database, a data table corresponding to the identifier of the storage device is created.

Step S204: a view table mapped to by the data table is created.

In some feasible implementations, the system creates the view table to which the data table maps according to the identifier of the storage device. The view table includes three views, i.e., the video view, the audio view, and the image view. The three views show the information about the media files which is quickly filtered from the data table and was already recorded in the media database during scanning when the current storage device was plugged into the STB terminal last time, and the three views change in real-time along with the change of the data in the data table. When the user wants to browse or play a video, music, an image, the user can quickly acquire information about all the media files in the storage device as long as he/she accesses the video view, the audio view, and the image view, respectively.

Step S205: priority of a task is adjusted.

In some feasible implementations, in order to quickly acquire the path information about all the media files in the storage device, priority of a scan of a first stage should be adjusted before the scan of the first stage. The priority of the scan of the first stage is adjusted to the first level which is a relatively high level, and only path information about the media files are acquired as far as possible.

Step S206: the storage device is scanned according to the scanning instruction, so as to acquire path information about a media file in the storage device.

In some feasible implementations, after setting the priority of the task, a file scan of the first stage is started according to the scanning instruction received by the system. The file scan of the first stage is a scan used for acquiring the path information about the media files in the storage device. The goal of the first stage is to quickly acquire the path information about all the media files in the storage device. The mounting path information about the storage device is acquired by calling an interface. And by using parameters, the scan of the first stage only acquires the path information about the media files, informs the system that the current scan is the scan of the first stage, and requests the system to perform an operation of adding records about the files. Calling the interface triggers the system to start fully scanning the storage device and only search for the path information about the media files according to the parameter convention of the called interface.

Furthermore, during the scan of the first stage, when the path information about the media files is acquired for the first time, a first indication information is transmitted to the terminal. The first indication information is used for indicating that the media files were found, such that a media application can know in time that the scan service has found the media files and stored them in the database, and the user can make use of them according to requirements. By transmitting the indication information used for indicating that the media files were found and adopting this mechanism, the user can acquire in time the existing media files according to a broadcast announcement as soon as possible when plugging the storage device and start the media application for browsing the files, thereby effectively avoiding having to wait to see the media files before the entire search process is completed in prior art, and improving user experience.

Step S207: the path information about the media file is compared with path information about a media file in the data table, so as to acquire path information about a media file that does not exist in the data table.

In some feasible implementations, before the system acquires the path information about the media files, the information about the media files in the data table is inquired. If the path information about the current media file already exists in the data table, it is indicated that this record already exists in the database, and it is unnecessary to adding again the current acquired media file into the database. If the path information about the current file does not exist in the data table, the path information about the current media file is stored in the cache. In this way, by means of such a data caching and real-time comparison mechanism, it is determined whether the acquired information already exists in the database, thereby effectively avoiding repeatedly adding the same file information into the database when a same storage device is frequently plugged or unplugged. For example, when a hard disk A in which three media files R1, R2, R3 are stored is plugged into the terminal for the first time, media scanning service adds absolute paths of the three files R1, R2, R3 in the hard disk A into the database. After a while, the user unplugs the hard disk A and copies three media files M1, M2, M3 from a personal computer. When the user plugs the hard disk A into the STB terminal again, a database storage unit in the media scanning service finds, by comparing and caching, that record information about the media files R1, R2, R3 in the hard disk already exists in the database, and therefore, only the three new added media files M1, M2, M3 need to be added into the database, thereby reducing time consumed for adding records about the files R1, R2, R3 into the database, and improving the rate of scanning the media files.

Step S208: the path information about the media file that does not exist in the data table is stored in the data table.

In some feasible implementations, during the scan of the first stage, the system stores and accumulates, in a cache, path information about media files not existing in the view tables. If number of pieces of the information about the media files accumulated in the cache exceeds a preset threshold, the media files in the view tables are added into the data file in the database corresponding to the UUID of the storage device without interruption. For example, if the number of records about the media files to be scanned which are accumulated in the cache exceeds 500 or the number does not exceed 500 when the scan of the first stage is completed, the records about the accumulated media files are added into the file table corresponding to the storage device. By means of this mechanism, rate of storing mass data can be improved, thereby improving the rate of scanning the media files.

Furthermore, after the scan of the first stage is completed, a second indication information is transmitted to the terminal immediately. The second indication information is a broadcast announcement indicating that the scan of the first stage is completed, such that the media application can know in time that the scan service has completed the full scan of the storage device and stored, in the database, the path information about all the media files in the storage device. The application can read and make use of them according to requirements, such as stopping a progress bar prompt during the scanning process.

Step S209: priority of a task is adjusted.

In some feasible implementations, after the scan of the first stage is completed, the priority of the task is adjusted. The priority of the task is adjusted to the second level which is a relatively low level. The scan of the second stage is scanning the newly added media files according to the path information about the newly added media files in the data table. The goal of the scan of the second stage is to acquire the specific information about the newly added media files in the data table and update the database by adding the information. The information includes a thumbnail, a size, playing duration, modification time of a video file, a thumbnail, a size, a genre, playing duration of a music file, a size, a resolution, a shooting time, a rotation angle of an image file, and so on. The information can enrich effect of an application displaying the media files. However, the information is unnecessary for normally playing the media files, each media file should be analyzed before acquiring the information. The process need to consume several time and greatly increases load of a CPU. Thus, it is performed at a low rate during the scan of the second stage, thereby ensuring that the system performance is not affected by this complex process.

Step S210: a newly added media file is scanned according to path information about the newly added media file in the data table, so as to acquire file information about the newly added media file, and a database is updated by adding the acquired file information.

In some feasible implementations, after finishing setting priority of the scan of the second stage, the scan of the second stage is started. The mounting path information about the storage device is acquired by calling an interface. And by using parameters, the scan of the second stage, according to the path information about the newly added media files in the data table, scans the newly added media files so as to acquire file information about the newly added media files, informs the system that the current scan is the scan of the second stage, and requests the system to perform an operation of updating (not adding) records about the files. Calling the interface triggers the system to fully scan the storage device and analyze detailed information about the media files to be scanned one by one according to the parameter convention of the called interface. By inquiring a group of records about the files in the cache, ID numbers in the data table corresponding to the media files are acquired, and the database is updated by adding the acquired detailed information about the media files by updating the database based on the ID numbers.

Furthermore, after the scan of the second stage is completed, a third indication information is transmitted to the terminal immediately. The third indication information is a broadcast announcement indicating that the scan of the second stage is completed, such that the media application can know in time that the scan service has completed the process of analyzing the information about all the media files in the storage device and stored the detailed information about all the media files in the database. The application can read and make use of them according to requirements, such as refreshing a displayed page, or displaying the specific information about the media files for the user.

In the implementation of the present disclosure, by means of receiving a scanning instruction, acquiring an identifier of a storage device according to the scanning instruction, and creating a view table mapped to by a data table according to the identifier of the storage device, scanning the storage device according to the scanning instruction so as to acquire path information about a media file in the storage device, comparing the path information about the media file with path information about a media file in the data table so as to acquire path information about a media file that does not exist in the data table, storing, in the data table, the path information about the media file that does not exist in the data table, scanning a newly added media file according to the path information about the newly added media file in the data table, so as to acquire file information about the newly added media file, and updating a database by adding the acquired file information, media files in a plurality of mass data storage devices can be quickly aggregated when the storage devices are plugged alternately, thereby improving the efficiency of scanning the local media files.

Figure 3:
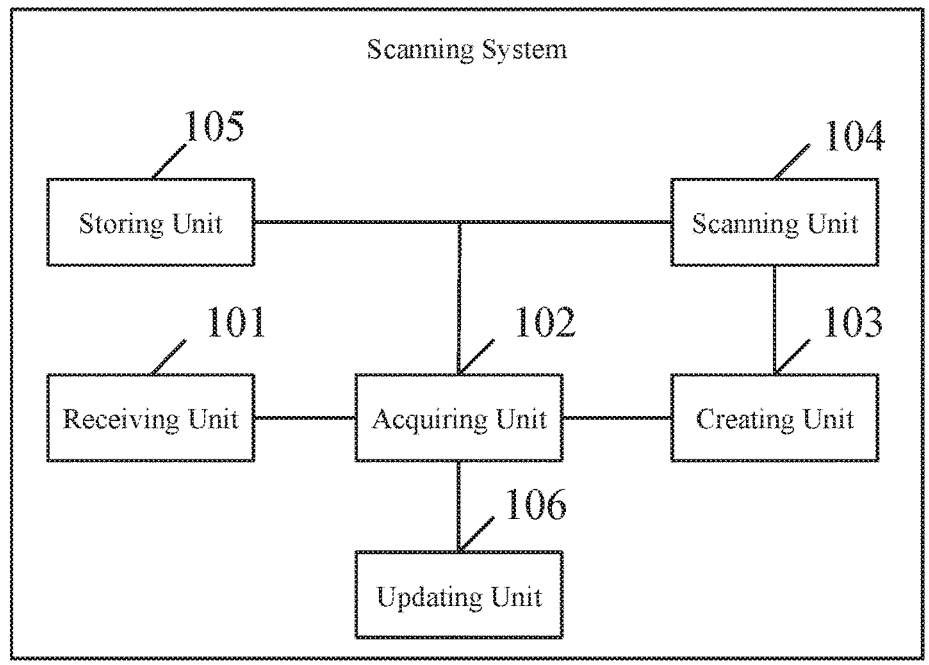
FIG. 3 is a schematic structural diagram of a system for scanning a local media file according to a third implementation of the present disclosure.

Referring to FIG. 3 which is a schematic structural diagram of a system for scanning a local media file according to a third implementation of the present disclosure, the system can include a receiving unit 101, an acquiring unit 102, a creating unit 103, a scanning unit 104, a storing unit 105 and an updating unit 106.

The receiving unit 101 is configured for receiving a scanning instruction.

The acquiring unit 102 is configured for acquiring an identifier of a storage device according to the scanning instruction received by the receiving unit.

The creating unit 103 is configured for creating a view table mapped to by a data table according to the identifier of the storage device acquired by the acquiring unit.

The scanning unit 104 is configured for scanning the storage device according to the scanning instruction received by the receiving unit.

The acquiring unit 102 is further configured for acquiring path information about the media file in the storage device when the scanning unit scans the storage device.

The acquiring unit 102 is further configured for comparing the path information about the media file acquired by the acquiring unit with path information about a media file in the data table, so as to acquire path information about a media file that does not exist in the data table.

The storing unit 105 is configured for storing, in the data table, the path information about the media file that does not exist in the data table and is acquired by the acquiring unit.

The scanning unit 104 is further configured for scanning a newly added media file according to path information about the newly added media file in the data table.

The acquiring unit 102 is further configured for acquiring file information about the media file, when the scanning unit scans the media file in the data table.

The updating unit 106 is configured for updating a database by adding the file information about the media file acquired by the acquiring unit.

In the implementation of the present disclosure, the receiving unit 101 receives a scanning instruction, the acquiring unit 102 acquires an identifier of a storage device according to the scanning instruction, the creating unit 103 creates a view table mapped to by a data table according to the identifier of the storage device, the scanning unit 104 scans the storage device according to the scanning instruction, the acquiring unit 102 acquires path information about the media file in the storage device, the acquiring unit 102 compares the path information about the media file with path information about a media file in the data table, so as to acquire path information about a media file that does not exist in the data table, the storing unit 105 stores, in the data table, the path information about the media file that does not exist in the data table, the scanning unit 104 scans a newly added media file according to path information about the newly added media file in the data table, the acquiring unit 102 acquires file information about the newly added media file, the updating unit updates a database by adding the acquired file information. In this way, media files in a plurality of mass data storage devices can be quickly aggregated when the storage devices are plugged alternately, thereby improving the efficiency of scanning the local media files. In the implementation of the present disclosure, the way of implementing the system for scanning a local media file may correspond to the steps S101 to S105 in the method for scanning a local media file according to the first implementation of the present disclosure, and is not described in detail herein.

Figure 4:
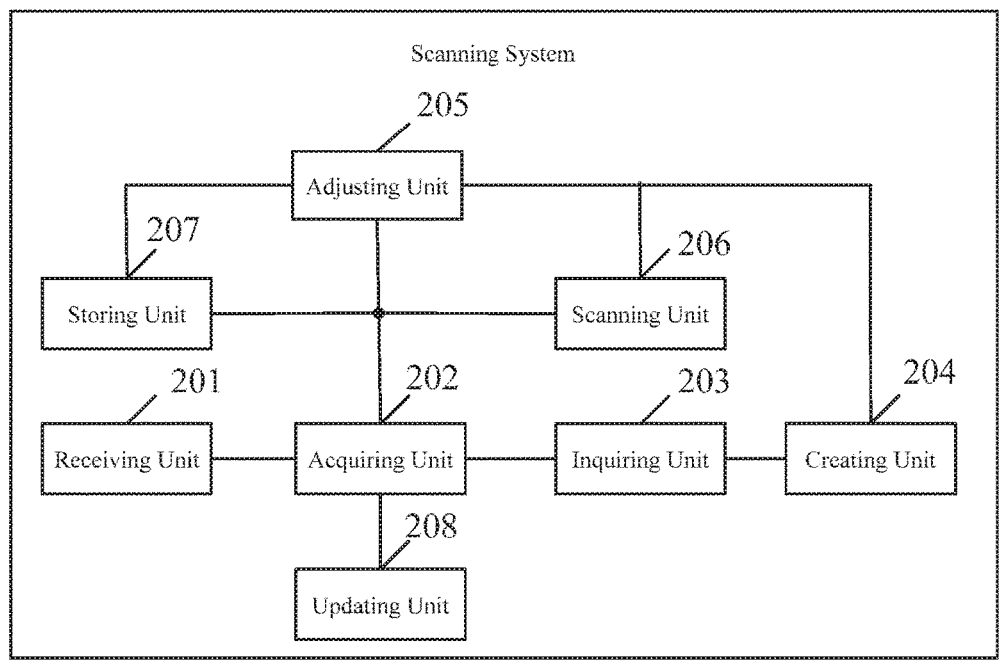
FIG. 4 is a schematic structural diagram of another system for scanning a local media file according to a fourth implementation of the present disclosure.

Referring to FIG. 4 which is a schematic structural diagram of another system for scanning a local media file according to a fourth implementation of the present disclosure, the system can include a receiving unit 201, an acquiring unit 202, an inquiring unit 203, a creating unit 204, an adjusting unit 205, a scanning unit 206, a storing unit 207 and an updating unit 208.

The receiving unit 201 is configured for receiving a scanning instruction.

The acquiring unit 202 is configured for acquiring an identifier of a storage device according to the scanning instruction received by the receiving unit.

The inquiring unit 203 is configured for inquiring whether a data table corresponding to the identifier is stored in a database, according to the identifier of the storage device acquired by the acquiring unit.

The creating unit 204 is configured for creating the data table corresponding to the identifier when the inquiring unit inquires that the data table corresponding to the identifier is not stored in the database.

The creating unit 204 is further configured for creating a view table mapped to by the data table according to the identifier of the storage device acquired by the acquiring unit.

The adjusting unit 205 is configured for adjusting priority of a task of acquiring path information about the media file in the storage device to be the first level.

The scanning unit 206 is configured for scanning the storage device according to the scanning instruction received by the receiving unit.

The acquiring unit 202 is further configured for acquiring the path information about the media file in the storage device when the scanning unit scans the storage device.

The acquiring unit 202 is further configured for comparing the path information about the media file with path information about a media file in the data table corresponding to the storage device in the database when the acquiring unit acquires the path information about the media file, so as to acquire path information about a media file that does not exist in the data table.

Furthermore, during the scan of the first stage, the acquiring unit 202 includes an inquiring subunit and a first storing subunit.

The inquiring subunit is configured for inquiring whether there is path information stored in the data table which is identical with the path information about the media file.

The first storing subunit is configured for storing the path information about the media file in a cache when the inquiring subunit inquires that there is not the path information stored in the data table which is identical with the path information about the media file.

Furthermore, during the scan of the first stage, the storing unit 207 includes a determining unit and a second storing subunit.

The determining unit is configured for determining whether number of pieces of the path information about the media files stored in the cache exceeds a preset threshold.

The second storing subunit is configured for storing, in the data table, the path information about the media files stored in the cache when the determining unit determines that the number of pieces of the path information about the media files stored in the cache exceeds the preset threshold.

Furthermore, a transmitting unit is configured for transmitting a first indication information to the terminal, when the path information about the media file is acquired for the first time, during the process of the acquiring unit acquiring the path information about the media file in the storage device. The first indication information is used for indicating that the media file was found.

Furthermore, the transmitting unit is further configured for transmitting a second indication information to the terminal when the acquiring unit completes acquiring the path information about media files in the storage device. The second indication information is used for indicating that acquiring the path information about the media files in the storage device is completed.

The adjusting unit 205 is further configured for adjusting priority of a task of scanning the newly added media file to be the second level, according to the path information about the newly added media file in the data table.

The scanning unit 206 is further configured for scanning the newly added media file according to the path information about the newly added media file in the data table.

The acquiring unit 202 is further configured for acquiring file information about the media file when the scanning unit scans the media file in the data table.

The updating unit 208 is configured for updating a database by adding the acquired file information about the media file.

Furthermore, the transmission unit is further configured for transmitting a third indication information to the terminal when the scanning unit completes scanning the media files in all the media file directories. The third indication information is used for indicating that scanning the media files in all the media file directories is completed.

In the implementation of the present disclosure, the receiving unit 201 receives a scanning instruction, the acquiring unit 202 acquires an identifier of a storage device according to the scanning instruction, the creating unit 204 creates a view table mapped to by a data table according to the identifier of the storage device, the scanning unit 206 scans the storage device according to the scanning instruction, the acquiring unit 202 acquires path information about the media file in the storage device, the acquiring unit 202 compares the path information about the media file with path information about a media file in the data table, so as to acquire path information about a media file that does not exist in the data table, the storing unit 207 stores, in the data table, the path information about the media file that does not exist in the data table, the scanning unit 206 scans a newly added media file according to path information about the newly added media file in the data table, the acquiring unit 202 acquires file information about the newly added media file, the updating unit updates a database by adding the acquired file information. In this way, media files in a plurality of mass data storage devices can be quickly aggregated when the storage devices are plugged alternately, thereby improving the efficiency of scanning the local media files. In the implementation of the present disclosure, the way of implementing the system for scanning a local media file may correspond to the steps S201 to S210 in the method for scanning a local media file according to the second implementation of the present disclosure, and is not described in detail herein.

Figure 5:
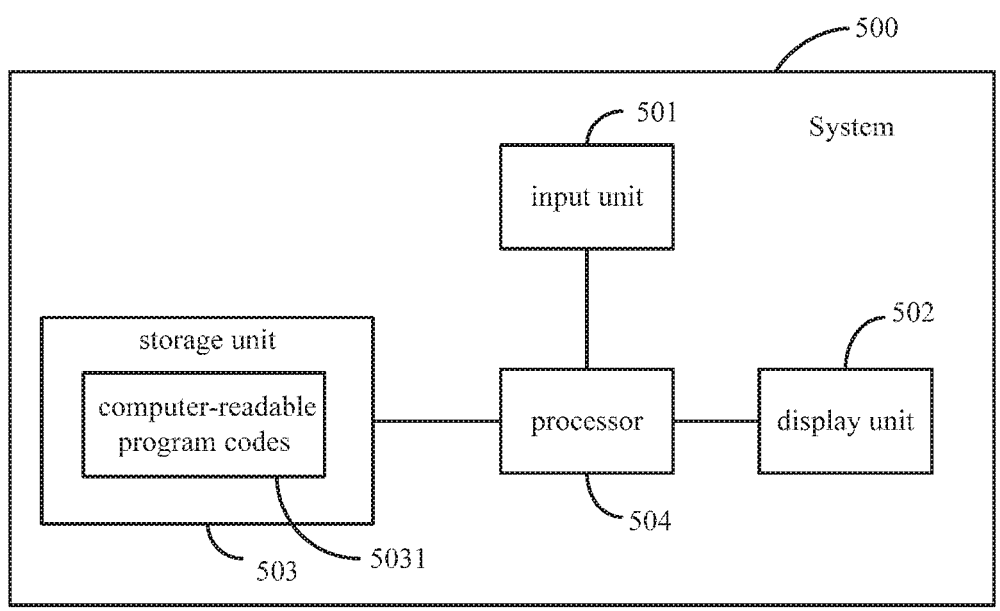
FIG. 5 is a schematic structural diagram of another system for scanning a local media file according to a fifth implementation of the present disclosure.

Referring to FIG. 5 which is a schematic structural diagram of another system for scanning a local media file according to a fifth implementation of the present disclosure. As illustrated in FIG. 5, the system 500 includes: an input unit 501, a display unit 502, a storage unit 503, and a processor 504. The input unit 501, the display unit 502, and the storage unit 503 are electrically connected to the processor 504.

The input unit 501 is configured for inputting information, such as letters. The input unit 501 may be but not limited to a physical keyboard, a touch-screen, or a combination of the physical keyboard and the touch-screen.

The display unit 502 is configured for displaying visual information, such as texts, images. The display unit 502 may be an LED display screen.

The storage unit 503 is configured for storing one or more computer-readable program codes 5031. The storage unit 503 can be a read only memory (ROM), a random access memory (RAM), a USB-disk, a removable hard disk, and so forth.

The processor 504 can include multiple cores for multi-thread or parallel processing.

In an implementation, the processor 504 is configured to execute the one or more computer-readable program codes 5031 to: receive a scanning instruction, acquire an identifier of a storage device according to the scanning instruction, and create a view table mapped to by a data table according to the identifier of the storage device; scan the storage device according to the scanning instruction, so as to acquire path information about a media file in the storage device; compare the path information about the media file with path information about a media file in the data table, so as to acquire path information about a media file that does not exist in the data table; store, in the data table, the path information about the media file that does not exist in the data table; and scan a newly added media file according to path information about the newly added media file in the data table, so as to acquire file information about the newly added media file, and update a database by adding the acquired file information.

In an implementation, after the processor 504 is configured to execute the one or more computer-readable program codes 5031 to acquire the identifier of the storage device, the processor is further configured to execute the one or more computer-readable program codes to: inquire whether a data table corresponding to the identifier is stored in the database according to the identifier of the storage device; and create the data table corresponding to the identifier when the data table corresponding to the identifier is not stored in the database.

In an implementation, before the processor 504 is configured to execute the one or more computer-readable program codes 5031 to scan the storage device according to the scanning instruction, so as to acquire the path information about the media file in the storage device, the processor is further configured to execute the one or more computer-readable program codes to: adjust priority of a task of acquiring the path information about the media file in the storage device.

In an implementation, the processor 504 being configured to execute the one or more computer-readable program codes 5031 to compare the path information about the media file with the path information about the media file in the data table, so as to acquire path information about the media file that does not exist in the data table, comprises, the processor 504 being further configured to execute the one or more computer-readable program codes 5031 to: inquire whether there is path information stored in the data table which is identical with the path information about the media file; and store the path information about the media file in a cache, when there is not the path information stored in the data table which is identical with the path information about the media file.

In an implementation, the processor 504 being configured to execute the one or more computer-readable program codes 5031 to store, in the data table, the path information about the media file that does not exist in the data table, comprises the processor 504 being further configured to execute the one or more computer-readable program codes 5031 to: determine whether number of pieces of the path information about media files stored in the cache exceeds a preset threshold; and store, in the data table, the path information about the media files stored in the cache, when the number of pieces of the path information about the media files stored in the cache exceeds the preset threshold.

In an implementation, the processor 504 is further configured to execute the one or more computer-readable program codes 5031 to transmit a first indication information to the terminal, when the path information about the media file is acquired for the first time, during the process of acquiring the path information about the media file in the storage device, wherein the first indication information is used for indicating that the media file was found.

In an implementation, the processor 504 is further configured to execute the one or more computer-readable program codes 5031 to transmit a second indication information to the terminal when acquiring the path information about media files in the storage device is completed, wherein the second indication information is used for indicating that acquiring the path information about the media files in the storage device is completed.

In an implementation, before the processor 504 is configured to execute the one or more computer-readable program codes 5031 to scan a newly added media file according to the path information about the newly added media file in the data table, the processor 504 is further configured to execute the one or more computer-readable program codes 5031 to: adjust priority of a task of scanning the media file to be the second level, according to the path information about the media file in the data table.

In an implementation, the processor 504 is further configured to execute the one or more computer-readable program codes 5031 to transmit a third indication information to the terminal when scanning the newly added media file according to the path information about the newly added media file in the data table is completed, wherein the third indication information is used for indicating that scanning the newly added media file in the data table is completed.

Persons skilled in the art should understand that all of a part of the steps in the methods of the above implementations may be completed by a computer program instructing relevant hardware. The program may be stored in a computer-readable storage medium and when the program is executed, the steps in the methods of the implementations may be included. The storage medium may be a magnetic disk, an optical disk, a ROM (Read-Only Memory) or a RAM (Random Access Memory).

The foregoing implementations are merely preferred implementations of the present disclosure and are not intended to limit the scope of the claims of the present disclosure. Any equivalent variance made according to the claims of the present disclosure shall fall within the scope of the present disclosure.

What is claimed is:

1. A method for scanning a local media file, comprising:
   receiving a scanning instruction, acquiring an identifier of a storage device according to the scanning instruction, and creating a view table mapped to by a data table according to the identifier of the storage device;
   scanning the storage device according to the scanning instruction, so as to acquire path information about a media file in the storage device;
   comparing the path information about the media file with path information about a media file in the data table, so as to acquire path information about a media file that does not exist in the data table, at least in part by:
      inquiring whether there is path information stored in the data table which is identical with the path information about the media file; and
      storing the path information about the media file in a cache, when there is not the path information stored in the data table which is identical with the path information about the media file;
   storing, in the data table, the path information about the media file that does not exist in the data table; and
   scanning a newly added media file according to path information about the newly added media file in the data table, so as to acquire file information about the newly added media file, and updating a database by adding the acquired file information.

2. The method of claim 1, wherein after acquiring the identifier of the storage device, the method further comprises:
   inquiring whether a data table corresponding to the identifier is stored in the database according to the identifier of the storage device; and
   creating the data table corresponding to the identifier when the data table corresponding to the identifier is not stored in the database.

3. The method of claim 1, wherein before scanning the storage device according to the scanning instruction, so as to acquire the path information about the media file in the storage device, the method further comprises:
   adjusting priority of a task of acquiring the path information about the media file in the storage device.

4. The method of claim 1, wherein storing, in the data table, the path information about the media file that does not exist in the data table, comprises:
   determining whether number of pieces of the path information about media files stored in the cache exceeds a preset threshold; and
   storing, in the data table, the path information about the media files stored in the cache, when the number of pieces of the path information about the media files stored in the cache exceeds the preset threshold.

5. The method of claim 1, wherein the method further comprises transmitting a first indication information to the terminal, when the path information about the media file is acquired for the first time, during the process of acquiring the path information about the media file in the storage device, wherein the first indication information is used for indicating that the media file was found.

6. The method of claim 1, wherein the method further comprises transmitting a second indication information to the terminal when acquiring the path information about media files in the storage device is completed, wherein the second indication information is used for indicating that acquiring the path information about the media files in the storage device is completed.

7. The method of claim 1, wherein before scanning a newly added media file according to the path information about the newly added media file in the data table, the method further comprises:
   adjusting priority of a task of scanning the media file to be the second level, according to the path information about the media file in the data table.

8. The method of claim 1, wherein the method further comprises transmitting a third indication information to the terminal when scanning the newly added media file according to the path information about the newly added media file in the data table is completed, wherein the third indication information is used for indicating that scanning the newly added media file in the data table is completed.

9. A system for scanning a local media file, comprising:
   a memory storing one or more computer-readable program codes; and
   a processor configured to execute the one or more computer-readable program codes to:
   receive a scanning instruction, acquire an identifier of a storage device according to the scanning instruction, and create a view table mapped to by a data table according to the identifier of the storage device;
   scan the storage device according to the scanning instruction, so as to acquire path information about a media file in the storage device;
   compare the path information about the media file with path information about a media file in the data table, so as to acquire path information about a media file that does not exist in the data table, at least in part by:

inquiring whether there is path information stored in the data table which is identical with the path information about the media file; and storing the path information about the media file in a cache, when there is not the path information stored in the data table which is identical with the path information about the media file;

store, in the data table, the path information about the media file that does not exist in the data table; and scan a newly added media file according to path information about the newly added media file in the data table, so as to acquire file information about the newly added media file, and update a database by adding the acquired file information.

10. The system of claim 9, wherein after the processor is configured to execute the one or more computer-readable program codes to acquire the identifier of the storage device, the processor is further configured to execute the one or more computer-readable program codes to:

inquire whether a data table corresponding to the identifier is stored in the database according to the identifier of the storage device; and create the data table corresponding to the identifier when the data table corresponding to the identifier is not stored in the database.

11. The system of claim 9, wherein before the processor is configured to execute the one or more computer-readable program codes to scan the storage device according to the scanning instruction, so as to acquire the path information about the media file in the storage device, the processor is further configured to execute the one or more computer-readable program codes to:

adjust priority of a task of acquiring the path information about the media file in the storage device.

12. The system of claim 1, wherein the processor being configured to execute the one or more computer-readable program codes to store, in the data table, the path information about the media file that does not exist in the data table, comprises the processor being further configured to execute the one or more computer-readable program codes to:

determine whether number of pieces of the path information about media files stored in the cache exceeds a preset threshold; and store, in the data table, the path information about the media files stored in the cache, when the number of pieces of the path information about the media files stored in the cache exceeds the preset threshold.

13. The system of claim 9, wherein the processor is further configured to execute the one or more computer-readable program codes to transmit a first indication information to the terminal, when the path information about the media file is acquired for the first time, during the process of acquiring the path information about the media file in the storage device, wherein the first indication information is used for indicating that the media file was found.

14. The system of claim 9, wherein the processor is further configured to execute the one or more computer-readable program codes to transmit a second indication information to the terminal when acquiring the path information about media files in the storage device is completed, wherein the second indication information is used for indicating that acquiring the path information about the media files in the storage device is completed.

15. The system of claim 9, wherein before the processor is configured to execute the one or more computer-readable program codes to scan a newly added media file according to the path information about the newly added media file in the data table, the processor is further configured to execute the one or more computer-readable program codes to:

adjust priority of a task of scanning the media file to be the second level, according to the path information about the media file in the data table.

16. The system of claim 9, wherein the processor is further configured to execute the one or more computer-readable program codes to transmit a third indication information to the terminal when scanning the newly added media file according to the path information about the newly added media file in the data table is completed, wherein the third indication information is used for indicating that scanning the newly added media file in the data table is completed.

* * * * *